United States Patent Office 2,859,190
Patented Nov. 4, 1958

2,859,190
WAX-RESIN EMULSION FOR WATER VAPOR PROOFING PAPER AND METHOD OF PRODUCING SAME

Richard H. Cubberley, Morris Township, and M. Benjamin Dell, Morristown, N. J., assignors to The Patent and Licensing Corporation, New York, N. Y., a corporation of Massachusetts No Drawing. Application August 26, 1953
Serial No. 376,750

3 Claims. (Cl. 260—28.5)

The present invention relates to an improved emulsion particularly adapted for making paper and paperboard impermeable to water vapor.

Boxboard, for many years, has been made with a bituminous layer interposed between the intermediate plies of the sheet. This has provided a material which is resistant to the passage of water vapor and wherein the vapor-proofing medium is inexpensively applied and substantially protected from removal or cracking when the board is folded, as might be the case with surface coated board.

In the commercial application of this process, an aqueous dispersion of bituminous waterproofing material in the form of a film or layer is applied to the surface of a wet ply on a paper making machine which is combined with other wet plies to form a multiple ply sheet with the bitumen in the inside. The bituminous material is of such a nature that the coating between the plies does not initially prohibit the water from draining off the paper, and yet after passing through dryer rolls a continuous film is formed which is resistant to the passage of water vapor.

Process and apparatus for coating the wet plies in this manner are described, for example, in U. S. Patents Nos. 1,686,818; 1,722,432; 1,724,137; 1,732,361, and more recent improvements are found in U. S. Patents Nos. 2,622,313 and 2,622,491. While this process and the product thereof has been found highly successful for many years, nevertheless, in certain applications such as containers for food, it is more desirable to have a material not possessing the black color of the bitumen and having greater water vapor resistance. Such a product should retain all of the other desirable features of the bitumen coating process, including the fact that the coating does not come in contact with the contents of a container which may be made from the board and also does not interfere with printing, folding or glueing the board. Furthermore, it is desirable to have a grease barrier.

It is a principal object of the present invention to provide an improved emulsion particularly adapted for water vapor-proofing board by the application to the wet plies thereof.

It is a further object of the present invention to provide an emulsion yielding a film having a greater water vapor transmission resistance than presently used bituminous emulsion.

It is a further object of the present invention to provide an improved moisture vapor-proofing emulsion applicable to wet plies of paper which initially does not prevent drainage and drying of the wet sheet during its manufacture.

It is a further object of the present invention to provide an improved moisture vapor-proofing emulsion applicable to wet plies of paper which initially does not prevent drainage of the wet sheet and which subsequently forms a water vapor-proof film which does not bleed substantially into the paper, even when heated during the usual drying operation on the paperboard machine.

These and other objects are attained by the present invention which relates to an improved emulsion comprising a major proportion of wax, a minor proportion of solid polyisobutene or polyethylene, and utilizing clay as an emulsifying agent, together with a cationic promoter.

In order to obtain the desirable ratio of polyisobutene or polyethylene and wax to clay, it has been found necessary to utilize a cationic promoter. For example, a ratio of 2½ parts of polyisobutene and wax to 1 part of kaolin clay will form an unstable emulsion without a promoter. However, in order to obtain ratios of 3 to 10 parts of polyisobutene wax per part of kaolin clay in a stable emulsion, it is necessary to use a promoter. It has been found that a cationic promoter such as an alkyl amine is effective.

Petroleum waxes may be used, including paraffin wax, but microcrystalline wax is preferable, since it gives a film which does not crack or craze easily.

The clay is selected from the group consisting of ball clay and kaolin clay, but kaolin clay has been found preferable. The clay stabilized emulsion on drying forms a film which will not flow under heat because of the honeycomb structure of the film. Clays such as bentonite are not desirable because of the difficulty of drainage due to highly colloidal gels which are formed and which may permit the sheet to separate.

The polyisobutene should be a substantially solid material which is somewhat elastomeric in nature, having a molecular weight in the range 30,000 to 150,000. The polyethylene should be a substantially solid resinous material, or in other words, having a molecular weight in the range 7,000 to 25,000. The invention is primarily concerned with either of these two materials or with mixtures thereof, or with mixtures of either one and small amounts of other resins. Preferably however, substantially pure polyisobutene is used. The most preferable material is GRI or Butyl rubber, which is substantially pure polyisobutene being a copolymer of isobutene with approximately 2.5% of isoprene. Another suitable commercial product is known as "Vistanex," which is similar to the Butyl rubber but does not contain polyisoprene.

The amount of polymer should be in the range 5 to 45% of the total polymer wax composition and is preferably about 25%. Mixtures of the two polymers found particularly suitable include 5 parts polyethylene, 20 parts polyisobutene and 75 parts wax. In any case, a desirable composition of polymer and wax should have a viscosity of about 100,000 centipoises at 180 to 220° F.

The cationic promoter may be any cationic surface active agent. Of these, it has been found preferable to use an amine known commercially as "Armeen H. T. D.," which is approximately 25% hexadecyl amine, 70% octadecyl amine and 5% octadecenyl amine. The cationic surface active agents are illustrated by the following:

A. Aliphatic amines and their derivatives. Dodecylamine
B. Homologs of aromatic amines having fatty chains. Dodecylaniline
C. Fatty amides derived from aliphatic diamines. Undecylimidazoline
D. Fatty amides derived from disubstituted diamines. Oleylaminodiethylamine
E. Quaternary ammonium salts and hydrates. Triethyl cetyl ammonium iodide
F. Amides obtained from amino alcohols and their quaternary ammonium derivatives. Dimethylstearyl hydroxyethyl ammonium
G. Quaternary ammonium bases derived from the fatty amides of disubstituted diamines.

H. Fatty amides derived from benzimidazolines.

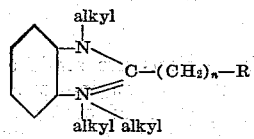

I. Basic pyridinium compounds and their salts. Octadecyl methylene pyridinium acetate
J. Basic sulfonium, phosphonium and antimonium compounds. Methyl sulfate of dimethyloctadecyl sulfonium
K. Betaine compounds of quaternary ammonium. Hydrochloride of dimethyloctadecylmethyl aminoacetate
L. Dimethylphenylbenzyl ammonium chloride.
M. Urethanes or basic salts of ethylene diamine. Menthol diurethane hydrochloride
N. Polyethylene diamines and their quaternary ammonium derivatives.
O. Polypropanol polyethanolamines.

EXAMPLE

All equipment should be clean to prevent discoloration of the emulsion. The water used should be substantially free of sulfur compounds.

*Preparation of master batch*

| | Parts |
|---|---|
| (GRI) | 96.5 |
| Microcrystalline wax (M. P.—180° F., 30 pen. at 77° F.) | 53.5 |

The polyisobutene was placed in a slightly warm Banbury mixer. The batch was mixed until the temperature rose to 250–300° F. and then about ¼ of the total wax was added. This was repeated 3 times, the wax being added only when the temperature was between 250 and 300° F.

*Preparation of emulsion*

| | Parts |
|---|---|
| Master batch | 150 |
| Microcrystalline wax | 236 |
| Alkyl amine (Armeen H. T. D.) | 0.2 |

Clay slip at 210° F.:
 77.1 parts of kaolin clay (Crossman clay)
 154.2 parts water
Lignin sulphonate: 0.25 part of lignin sulphonate (Marasperse N) was dissolved in 1 part of water heated between 140 and 150° F.

| | |
|---|---|
| Water | 223 |

The master batch was mixed with about 45 parts wax in a Baker-Perkins dispersion mixer heated to about 100 to 120° F. When a homogeneous blend was produced, 45 parts more of wax were added. As soon as the blend again became homogeneous the remainder of the wax was added. After waiting several minutes and then raising the temperature of the blend to 195–200° F. the alkyl amine was added. At this point the mixer was stopped and the entire clay slip quickly added. The mixer was immediately started and the temperature maintained at 180° F. after which the blend inverted. After a few minutes the mixture assumed a homogeneous appearance and part of the water at 210° F. was added gradually for several minutes. Thereafter, the rest of the water at room temperature was added and the lignin sulphonate solution added. The emulsion was passed through a 30 mesh screen and stored in polyethylene lined drums.

The emulsion of this example was diluted with equal parts of water and delivered to an application apparatus on a paper machine of the type adapted to apply bituminous emulsion to wet plies. The usual device for application is a wire covered cylinder immersed in a bath of the emulsion maintained at a constant level. The finished board made on the machine was tested after passing through the drying rolls and stacked in the usual manner. Examination of the sheet showed that the film had not migrated, and the plies adhered satisfactorily.

Water vapor permeability tests were made by covering weighed dishes of anhydrous calcium chloride with samples of board, placing the dishes in a constant humidity apparatus such as the General Foods cabinet, and then weighing the dishes again at stated time intervals. The tests are ASTM tests D988–51T. The average water vapor transmission of the sheet was very low, averaging about 0.4 gram of water per 100 square inches of board per 24 hours at 100° F. with 90% relative humidity for 10 lbs. blend per 1000 square feet of board. This compares with a moisture vapor transmission of 2.5 grams for a coverage of about 20 lbs. per 1000 square feet of bitumen.

We claim:
1. An emulsion suitable for water vapor proofing paper comprising water, microcrystalline wax, a solid polymer selected from the group consisting of polyisobutene and polyethylene and mixtures thereof and a copolymer of isobutene and isoprene, the weight of said wax exceeding the weight of said polymer, a clay selected from the group consisting of kaolin and ball clay as an emulsifying agent, and a cationic surface active agent as a promoter for said clay, wherein the ratio of combined wax and polymer is 3 to 10 parts per part of clay.

2. An emulsion suitable for water vapor proofing paper comprising water, microcrystalline wax, polyisobutene copolymerized with polyisoprene, kaolin clay as an emulsifying agent and an alkyl amine surface active agent promoter for said clay wherein the amount of copolymer is in the range 5% to 30% by weight of the combined wax and copolymer, wherein the proportion of copolymer and wax to clay is in the ratio of 3 to 10 parts of copolymer and wax per part of clay, and wherein there are about 0.2 part by weight of amine to each 77 parts of clay.

3. A process for producing an emulsion suitable for water vapor proofing paper which comprises mixing polyisobutene and microcrystalline wax in a Banbury mixer, further mixing in a Baker-Perkins mixer with the addition of more wax, a kaolin clay-water slip, and an alkyl amine surface active agent, and finally diluting with additional water to obtain a pourable emulsion wherein the ratio of combined polyisobutene and wax is 3 to 10 parts per part of clay.

References Cited in the file of this patent

UNITED STATES PATENTS

| 2,277,788 | Shipp et al. | Mar. 31, 1942 |
| 2,370,057 | Mack | Feb. 20, 1945 |
| 2,394,616 | Knoth et al. | Feb. 12, 1946 |

OTHER REFERENCES

Hackh's Chem. Dictionary, 2nd edition, 1937.